United States Patent
Ling et al.

(10) Patent No.: US 10,956,534 B2
(45) Date of Patent: Mar. 23, 2021

(54) SYSTEM AND METHOD FOR CONTINUOUS PERFORMANCE ANALYSIS OF SYSTEMS THAT EXHIBIT VARIABLE PERFORMANCE CHARACTERISTICS AT DIFFERENT OPERATING CONDITIONS

(71) Applicant: HONEYWELL INTERNATIONAL INC., Morristown, NJ (US)

(72) Inventors: Richard Ling, Scottsdale, AZ (US); Kevin Moeckly, Chandler, AZ (US); Larry Yee, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 751 days.

(21) Appl. No.: 13/772,014

(22) Filed: Feb. 20, 2013

(65) Prior Publication Data
US 2014/0236534 A1  Aug. 21, 2014

(51) Int. Cl.
G06F 17/00 (2019.01)
G01M 15/14 (2006.01)
G05B 23/02 (2006.01)

(52) U.S. Cl.
CPC ............ *G06F 17/00* (2013.01); *G01M 15/14* (2013.01); *G05B 23/024* (2013.01)

(58) Field of Classification Search
CPC ....... G06F 17/00; G05B 23/024; G01M 15/14
(Continued)

(56) References Cited

U.S. PATENT DOCUMENTS 5,823,479 A  10/1998  Nield et al.
6,260,004 B1  7/2001  Hays et al.
(Continued)

FOREIGN PATENT DOCUMENTS

EP   1258618 A2   11/2002
EP   1926001 A2   5/2008

OTHER PUBLICATIONS

Hindman, R. et al.; Design of a Missile Autopilot using Adaptive Nonlinear Dynamic Inversion; 2005 American Control Conference, Jun. 8-10, 2005, Portland OR, USA.
(Continued)

*Primary Examiner* — Catherine T. Ratovski
(74) *Attorney, Agent, or Firm* — Lorenz & Kopf, LLP

(57) ABSTRACT

A system and method for translating performance characteristics of a system from one system condition to another system condition includes sensing, at a current system condition, a first system performance parameter and a second system performance parameter. The first and second system performance parameters correspond to a measured performance characteristic value of the system. A first reference performance datum associated with the first and second system performance parameters at the current system condition, and a second reference performance datum associated with the first and second system performance parameters at a selected reference system condition are both retrieved from a memory. A difference between the first and second reference performance data is calculated to generate a translation value. The measured performance characteristic value of the system is then translated an amount equal to the data translation value, whereby a corrected performance characteristic value at the selected reference system condition is generated.

6 Claims, 5 Drawing Sheets

(58) Field of Classification Search
USPC .......................................................... 702/182
See application file for complete search history.

(56) References Cited

U.S. PATENT DOCUMENTS

| | | | |
|---|---|---|---|
| 6,823,675 B2 | 11/2004 | Brunell et al. | |
| 8,068,997 B2* | 11/2011 | Ling | G05B 23/0254 |
| | | | 702/41 |
| 8,259,208 B2 | 9/2012 | Ciurea et al. | |
| 2003/0125906 A1 | 7/2003 | Guaglardi | |

OTHER PUBLICATIONS

Singh, B.; Online Aerodynamic Parameter Estimation for a Fault Tolerant Flight Control System; B.E., Nagpur University, 2002.
EP Examination Report for Application No. 14152957.8-1802 dated Jul. 4, 2017.
EP Search Report for Application No. 14152957.8-1802/2770390 dated Jun. 6, 2017.

* cited by examiner

SYSTEM AND METHOD FOR CONTINUOUS PERFORMANCE ANALYSIS OF SYSTEMS THAT EXHIBIT VARIABLE PERFORMANCE CHARACTERISTICS AT DIFFERENT OPERATING CONDITIONS

TECHNICAL FIELD

The present invention generally relates to performance analysis, and more specifically to a system and method of conducting a continuous performance analysis for systems that exhibit variable performance characteristics at different operating conditions.

BACKGROUND

Many systems are subject to some type of performance assessment upon system start-up and initialization to determine the capability of the system to perform various functions without exceeding a limit. For example, multi-spool gas turbine engines used in aerospace applications are often subject to a daily pre-flight power assurance test before beginning a mission. The purpose of the daily power assurance test is to verify the engine(s) can meet the minimum power requirements needed for its mission without exceeding the power turbine inlet temperature limit. Historically, daily engine power assurance tests have been conducted while the aircraft is at a relatively low altitude, and after steady-state engine conditions have been substantially achieved.

To address several drawbacks associated with the daily engine power assurance tests, the instant inventors, together with others, developed a performance analysis system and method. This system and method, disclosed in U.S. Pat. No. 8,068,997 (the '997 patent), uses an automated on-board algorithm that estimates engine performance margin continuously in-flight without having to perform the daily engine power assurance test. Engine performance margin is typically expressed as turbine exit temperature margin or power margin at the rating point condition of the engine. In order to provide a consistent and convenient method of assessing engine health throughout a flight, engine performance characteristics from the full range of flight conditions need to be accurately translated to the rating point condition. Engine manufacturers often specify the rating point condition as sea-level static and atmospheric conditions because the calculations required for translating to such a condition is typically much less complicated than other conditions.

For single-spool gas turbine engines, the flight condition translation process can be accomplished fairly accurately by applying flight condition correction factors on various engine parameters used in the performance analysis. For example, as disclosed in the '997 patent, theta correction ($\theta$-correction) and delta correction ($\delta$-correction) may be applied to compensate for variations in inlet temperature and pressure. However, this flight condition translation process does not work well for multiple-spool gas turbine engines that include variable geometry devices, such as compressor guide vanes or other variable geometry devices, to optimize engine performance based on flight conditions. This is because the gas turbine engine will have a different geometric configuration at each flight condition, based upon the settings of the guide vanes and/or other variable geometry devices. Typical flight condition correction factors work quite accurately for fixed-geometry engines, but not for variable-geometry engines.

Hence, there is a need for a system and method that can accurately and efficiently translate engine performance characteristics of a variable-geometry gas turbine engine from various flight conditions to the rating point condition as the flight condition changes throughout a flight. The present invention addresses at least this need.

BRIEF SUMMARY

In one embodiment, a method for translating performance characteristics of a system from one system condition to another system condition includes sensing, at a current system condition, a first system performance parameter and a second system performance parameter. The first and second system performance parameters correspond to a measured performance characteristic value of the system. A first reference performance datum associated with the first and second system performance parameters at the current system condition is retrieved from a memory. A second reference performance datum associated with the first and second system performance parameters at a selected reference system condition is retrieved from the memory. A difference between the first reference performance datum and the second reference performance datum is calculated, to thereby generate a translation value. The measured performance characteristic value of the system is translated an amount equal to the data translation value, to thereby generate a corrected performance characteristic value of the system at the selected reference system condition.

In another embodiment, a method of translating performance characteristics for a gas turbine engine from one engine condition to another engine condition includes sensing, at a current engine condition, a first engine performance parameter and a second engine performance parameter. The first and second engine performance parameters correspond to a measured performance characteristic value of the engine. A first reference performance datum associated with the first and second engine performance parameters at the current engine condition is retrieved from a memory. A second reference performance datum associated with the first and second engine performance parameters at a selected reference engine condition is retrieved from the memory. A difference between the first reference performance datum and the second reference performance datum is calculated, to thereby generate a translation value. The measured performance characteristic value of the engine is translated an amount equal to the data translation value, to thereby generate a corrected performance characteristic value of the engine at the selected reference engine condition.

In yet another embodiment, a gas turbine engine continuous performance analysis system includes a first sensor, a second sensor, memory, and a processor. The first sensor is operable to sense, at a current flight condition, a first engine performance parameter and supply first engine performance parameter data representative of the first engine performance parameter. The second sensor is operable to sense, at the current flight condition, a second engine performance parameter and supply second engine performance parameter data representative of the second engine performance parameter. The memory has stored therein reference performance data associated with the first and second engine performance parameters at a plurality of flight conditions. The processor is in operable communication with the first sensor, the second sensor, and the memory. The processor is coupled to receive the first and second engine performance parameter data from the first and second sensors, respectively, and is configured, upon receipt thereof, to: (1)

retrieve, from the memory, a first reference performance datum associated with the first and second engine performance parameters at the current flight condition; (2) retrieve, from the memory, a second reference performance datum associated with the first and second engine performance parameters at a selected reference flight condition; (3) calculate a difference between the first reference performance datum and the second reference performance datum, to thereby generate a translation value; and (4) translate the measured performance characteristic value of the engine an amount equal to the data translation value, to thereby generate a corrected performance characteristic value of the engine at the selected reference flight condition.

Furthermore, other desirable features and characteristics of the inventive system and methods will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although various embodiments are described herein in the context of a multi-spool gas turbine engine for use in an aircraft, the embodiments may be used with gas turbine engines in various other vehicles, and may also be used in conjunction with various other variable-geometry machines and systems, not just gas turbine engines, and in various other end-use environments.

Figure 1:
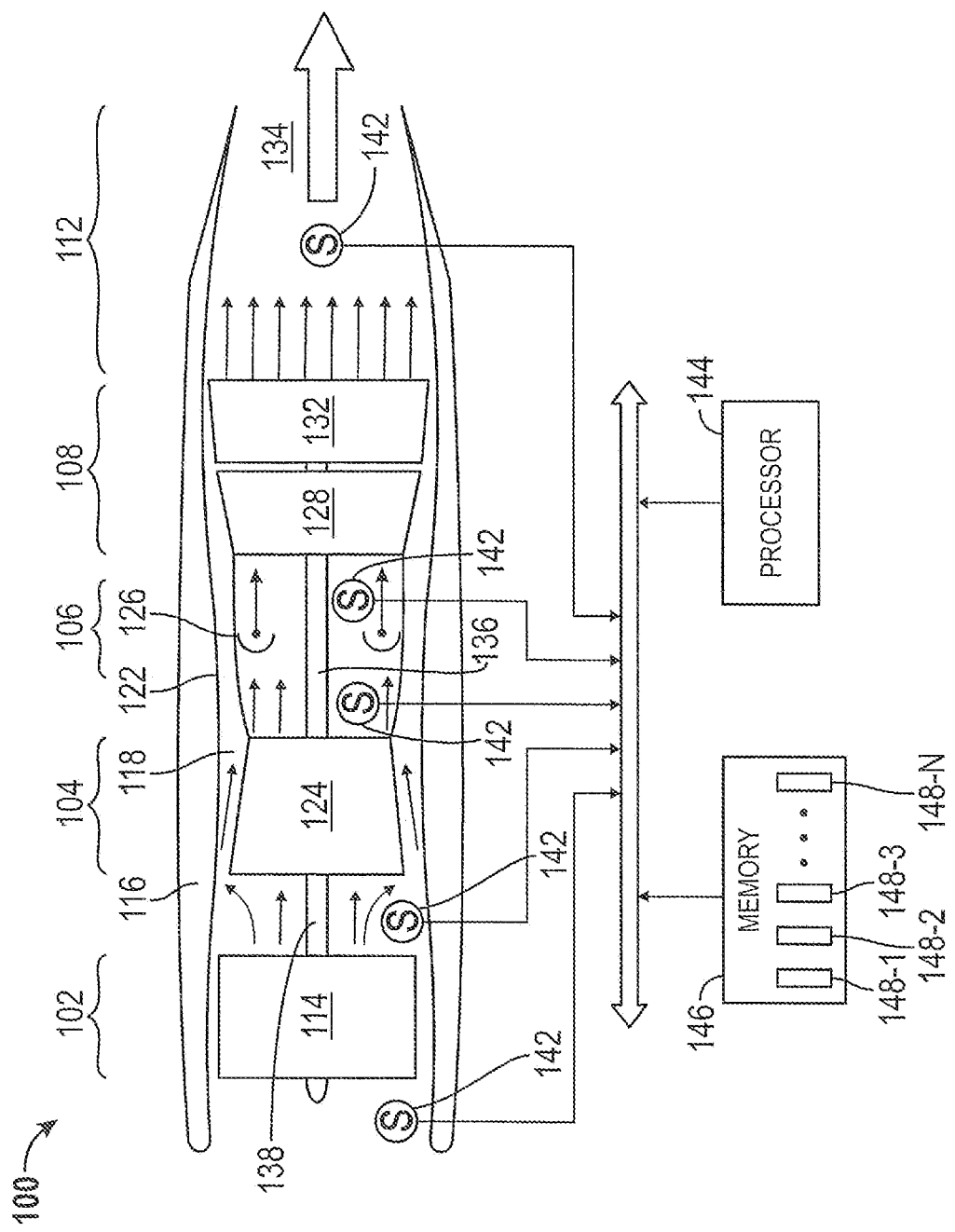
FIG. 1 is a functional block diagram of an exemplary variable-geometry gas turbine engine system.

Turning now to FIG. 1, a functional block diagram of an exemplary gas turbine engine is depicted. The depicted engine 100 is a multi-spool turbofan gas turbine propulsion engine, and includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass section 118 disposed between the fan case 116 and an engine cowl 122, and provides a forward thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel supplied from a non-illustrated fuel source. The fuel and air mixture is combusted, and the high energy combusted air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine 100 could be configured with more or less than this number of turbines. No matter the particular number, the combusted air mixture from the combustion section 106 expands through each turbine 128, 132, causing it to rotate. The combusted air mixture is then exhausted through a propulsion nozzle 134 disposed in the exhaust section 112, providing additional forward thrust. As the turbines 128 and 132 rotate, each drives equipment in the engine 100 via concentrically disposed shafts or spools. Specifically, the high pressure turbine 128 drives the compressor 124 via a high pressure spool 136, and the low pressure turbine 132 drives the fan 114 via a low pressure spool 138.

The depicted engine 100 also includes various non-illustrated variable geometry devices that may be controlled by, for example, a non-illustrated engine control. The variable geometry devices may be variously configured and implemented and may include, for example, compressor inlet guide vanes, bleed air valve(s), power extraction devices, and any one of numerous other devices that may cause geometric variations of the engine 100. As is generally known, the settings of these variable geometry devices may be scheduled as a function of flight conditions.

As FIG. 1 further depicts, a plurality of sensors 142 may be disposed in or near the engine 100. Each of the sensors 142 is coupled to a processor 144 and is operable to sense an engine parameter and supply performance data representative of the sensed parameter to the processor 144. It will be appreciated that the particular number, type, and location of each sensor 142 may vary. It will additionally be appreciated that the number and types of performance data supplied by the sensors 142 may vary depending, for example, on the particular engine type and/or configuration. In the depicted embodiment, however, at least a subset of the depicted sensors 142 supply performance data representative of, or that may be used to determine, engine inlet pressure, engine inlet temperature, engine speed, fuel flow, compressor discharge pressure, power turbine inlet temperature, engine torque, shaft horsepower, and thrust, to name just a few.

No matter the specific number and types of performance data, these data are supplied to the processor 144. The performance data supplied to the processor 144 are used to conduct a performance analysis of the engine 100. It will be appreciated that the performance analysis is preferably conducted continuously in real-time, while the engine 100 is operating. The processor 144, which may be implemented using one or more suitable general purpose microprocessors, may be part of one or more systems or devices installed within an aircraft, such as an engine control unit (ECU), a prognostic health monitoring system (PHMS), or a health utilization and monitoring system (HUMS), just to name a few, or it may be a stand-alone device.

Regardless of the specific location and implementation of the processor 144, it is configured to conduct a continuous performance analysis of the engine 100 using the performance data supplied from the sensors 142. The continuous performance analysis that the processor 144 conducts is accurate regardless of whether the collected performance data are steady state data or transient data. This is because the processor 144 is further configured to generate, using transient performance data, data that are representative of steady state performance data, which may then be used in subsequent portions of the continuous performance analysis. The continuous performance analysis that the processor 144 conducts is also accurate regardless of the geometry exhibited by the gas turbine engine 100, which, as noted above, may change with flight conditions. To do so, the processor 144, as part of the continuous performance analysis, calculates the nominal difference in performance parameter values between two flight conditions (or engine geometries) of interest. The calculated difference is then used as an offset to translate the performance parameter value of the first condition (or geometry) to the second condition (or geometry).

Figure 2:
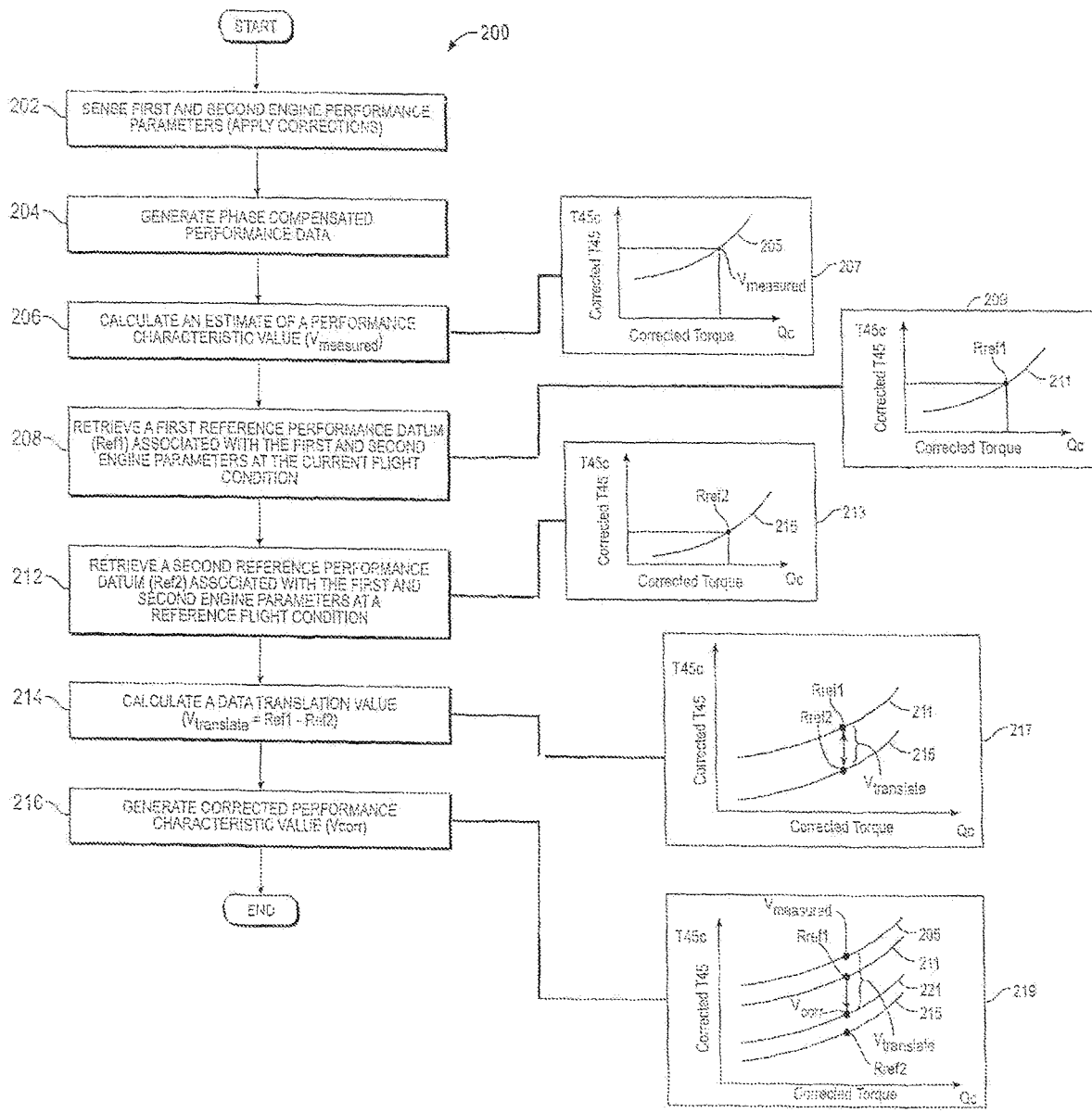
FIG. 2 depicts a process diagram of an exemplary method that may be implemented by the exemplary gas turbine engine system of FIG. 1 to translate performance parameter values of one flight (or engine) condition to a second flight (or engine) condition.

Turning now to FIG. 2, the method 200 that the processor 144 implements to allow accurate continuous performance analysis regardless of flight conditions/engine geometries is depicted in flowchart form, and will now be described. Before doing so, however, it is noted that, for the sake of completeness, the entire continuous performance analysis that is conducted by the processor 144 will also be described.

The processor 144, in implementing the method 200 depicted in FIG. 2, retrieves at least a portion of the engine performance data that are collected during, for example, the flight of the aircraft in which the engine 100 is installed. In the depicted embodiment, the processor 144 then corrects the performance data for the ambient conditions (202) at the time the data were collected by applying what are generally referred to as the theta correction (θ-correction) and the delta correction (δ-correction). As is generally known, the θ-correction is an ambient temperature correction factor, and the δ-correction is an ambient pressure correction factor. It will be appreciated that application of the ambient condition corrections is merely preferred, and need not be implemented if so desired.

Once the performance data are retrieved and, at least in the preferred embodiment, corrected for ambient conditions, the processor 144 then selects two of engine performance parameters, and generates phase compensated performance data that are representative of a steady state relationship between the selected engine parameters (204). It will be appreciated that the engine performance parameters that are selected may vary and may be selected based on the type of performance relationship that is desired to be analyzed. In the depicted embodiment, it is desired to conduct a continuous power assurance analysis of the engine 100. As such, the performance data for engine torque (Q) and power turbine inlet temperature (T45) are selected. Of course, various other pairs of parameters may be selected to conduct various other types of performance analysis of the engine 100.

Figure 3:
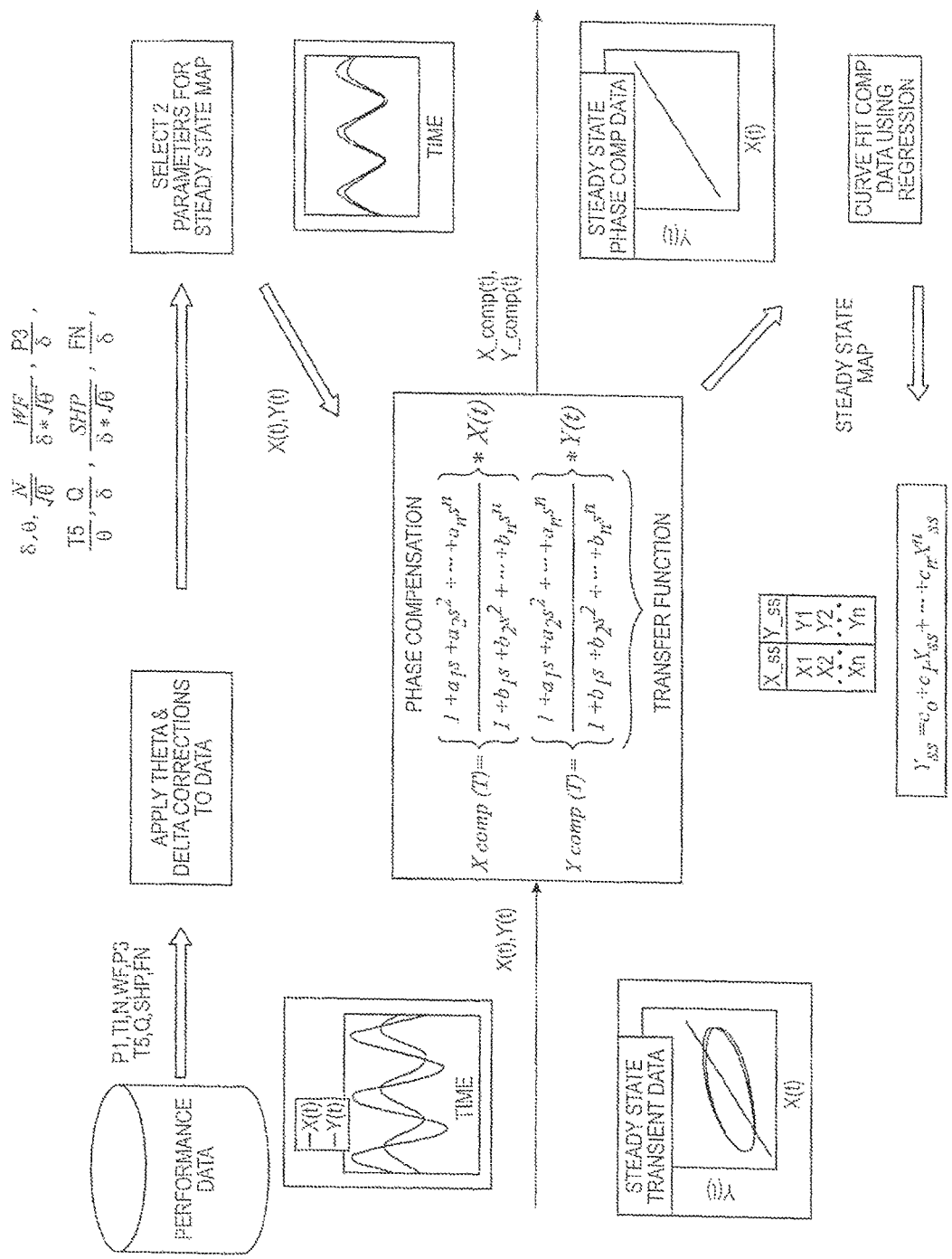
FIG. 3 depicts a process diagram of an exemplary method that may be implemented as part of the method depicted in FIG. 2 to generate phase compensated performance data.

Before proceeding further, it is noted that the methodology used to generate the phase compensated performance data (204) is depicted in FIG. 3 of the instant application, and is described in U.S. Pat. No. 8,036,844, which is entitled, "Transient Performance Data Phase Compensation System and Method." That application, which is assigned to the Assignee of the present application, and shares a common inventor, is hereby incorporated by reference. It is additionally noted that in some embodiments, one or both of the steps of correcting the performance data for the ambient conditions (202) and generating the phase compensated performance data (204) may not be performed.

Returning now to a description of the methodology depicted in FIG. 2, it is seen that the processor 144 uses the phase compensated engine performance data to calculate an estimate of a performance characteristic value of the engine 100 (206). The specific performance characteristic value that is computationally estimated may vary, but in one particular embodiment, as depicted in explanatory block 207, it is an estimate of a value on a performance characteristic curve of corrected turbine inlet temperature versus corrected torque 205.

After the performance characteristic value is calculated, the processor 144 retrieves, from memory 146 (see FIG. 1), a first reference performance datum (Rref1) (208) and a second reference performance datum (Rref2) (212). More specifically, and as shown more clearly in explanatory blocks 209 and 213, the processor retrieves, from memory 146, a first reference performance curve 211 that includes the first reference performance datum (Rref1), and a second reference performance curve 215 that includes the second reference performance datum (Rref2). The first reference performance curve 211 is associated with the first and second engine performance parameters at the current flight (or engine) condition. However, the second reference performance curve 215 is associated with the first and second engine performance parameters at a reference flight (or engine) condition. The reference flight (or engine) condition may vary, but is typically the rating point condition for engine performance assessment to which translation of the current performance value is to be translated. The first reference performance datum (Rref1) and the second reference performance datum (Rref2) are retrieved by evaluating the first and second reference performance curves 211, 215, respectively, at the same corrected parameter value as measured in the current flight (or engine) condition.

In one particular embodiment, the reference flight (or engine) condition is steady-state, sea level ambient conditions. As explanatory blocks 209 and 213 depict, for this embodiment the first reference performance datum (Rref1) and the second reference performance datum (Rref2) are each values on a performance characteristic curve of corrected turbine inlet temperature (T45$c$) versus corrected torque (Qc) at the current flight (or engine) condition and at the reference flight (or engine) condition, respectively. Thus, the first and second reference performance data (Rref1, Rref2) are retrieved by evaluating the first and second reference performance curves, respectively, at the same corrected torque that is derived from the measured torque at the current flight (or engine) condition.

It is noted that the depicted reference performance curves 211, 215 of corrected turbine inlet temperature (T45$c$) versus corrected torque (Qc) are merely exemplary, and that performance curves associated with various other engine parameters may be used, if needed or desired. Moreover, the first and second reference performance data (Rref1, Rref2) are retrieved by evaluating the first and second reference performance curves using either of the parameters (e.g., T45$c$ or Qc).

Before proceeding further, a brief description of the source of the stored reference performance data will be provided. Preferably, the source of these data is a reference performance model. The reference performance model may be implemented using an on-board engine model that does not exhibit the numerical convergence issues or high computational resource requirement that a hi-fidelity engine model typically exhibits. Alternatively, the reference performance model may be implemented as a look-up table that includes performance characteristic curves for all flight envelope and engine operating conditions that are derived from an engine model or an empirical model.

Figure 4:
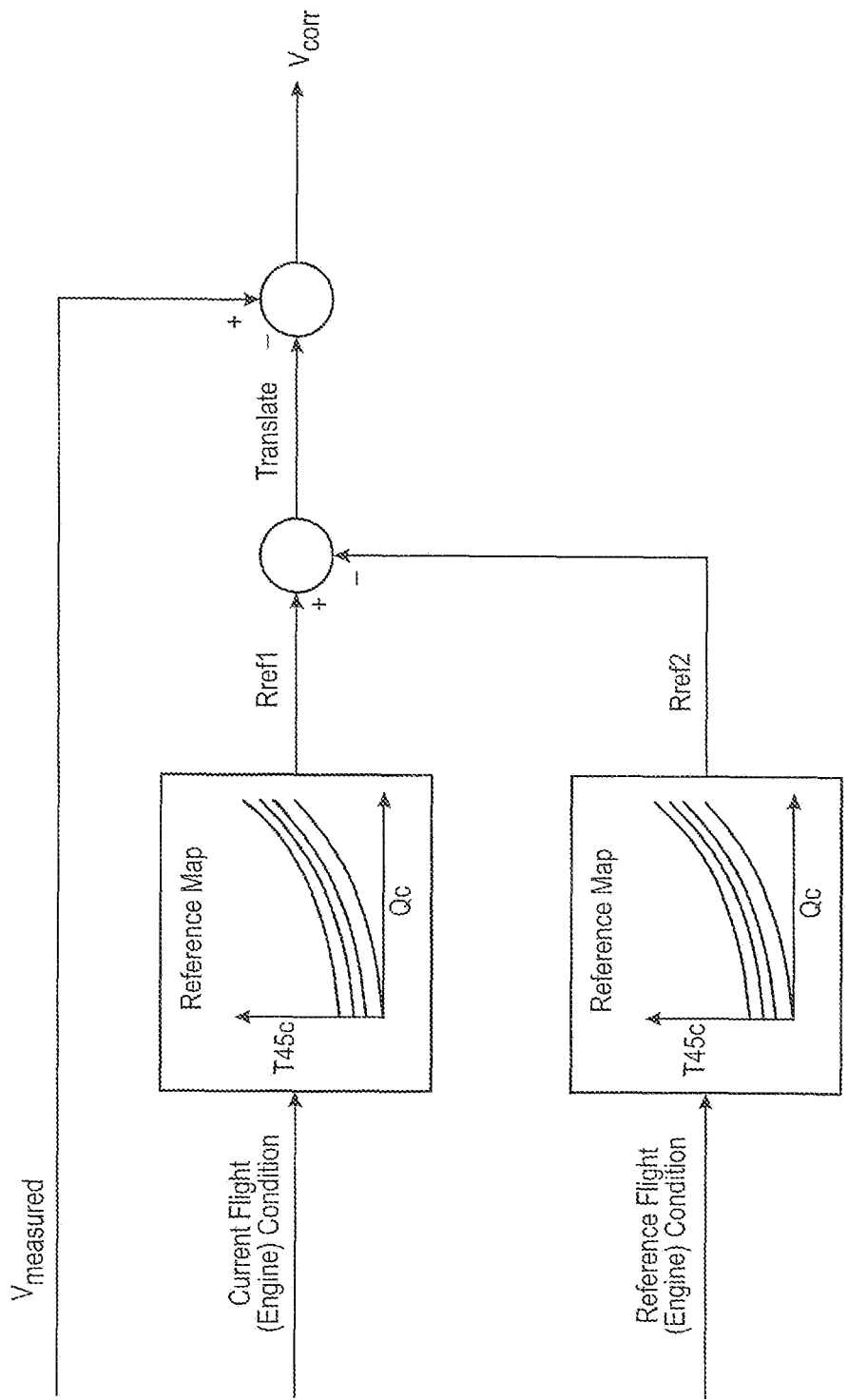
FIG. 4 depicts a method of translating a performance parameter value from one flight (or engine) condition to another implemented as part of the process depicted in FIG. 2.

Returning now to a description of the method 200, after the first and second reference performance data (Rref1, Rref2) are retrieved, the processor 144 calculates a data translation value (Vtranslate) in block 214. To do so, and as shown more clearly in FIG. 4 and explanatory block 217, the processor 144 calculates the difference between the first reference performance datum (Rref1) and the second reference performance datum (Rref2). Thereafter, and with reference to both FIGS. 2 and 4, the processor 144 generates a corrected performance characteristic value (Vcorr) of the engine 100 at the reference flight (engine) condition (216). To do so, and as FIG. 4 and explanatory block 219 depict, the processor 144 translates the measured performance characteristic value (Vmeasured) of the engine 100 by an amount equal to the data translation value (Vtranslate). When a number of measured performance characteristic values taken at various flight (engine) conditions are translated using the method 200, the resulting performance characteristic values at the reference flight (engine) condition will form a performance characteristic curve 221 at the reference flight (engine) condition, as shown in explanatory block 219 of FIG. 2.

It should be noted that the methodology described above assumes that engine-to-engine variations and deterioration effects on the relative performance differences between two flight/engine conditions are relatively small, even when the absolute change in performance due to engine-to-engine variations or deterioration effects can be quite significant. However, if this assumption is not correct, it can be fixed either by adapting the reference performance model to a specific engine or periodically updating the reference performance model as the engine deteriorates.

Figure 5:
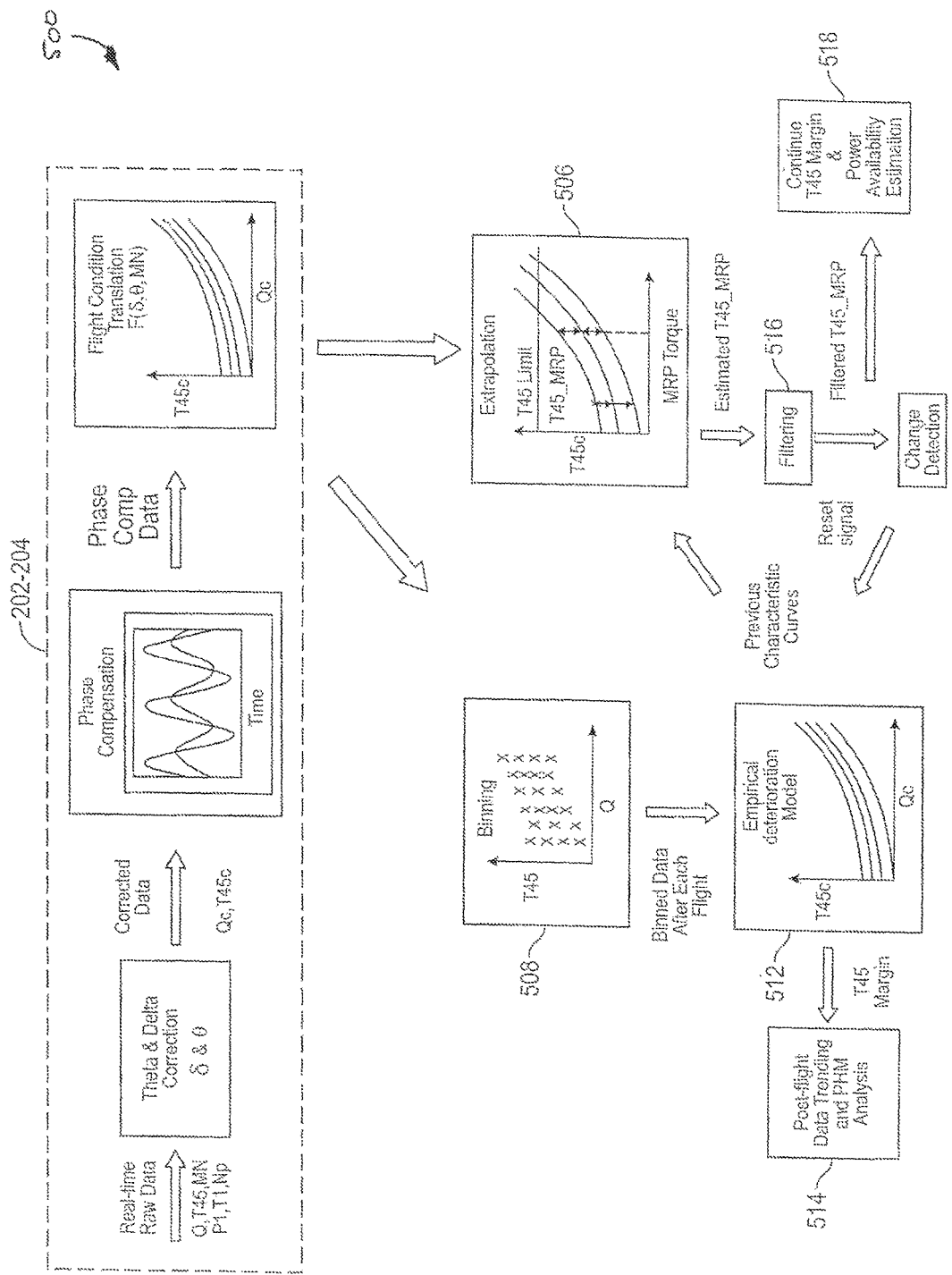
FIG. 5 depicts a process diagram of an exemplary method that may be implemented by the exemplary gas turbine engine system of FIG. 1 to conduct a continuous performance analysis using the process depicted in FIG. 2.

It was previously noted that the methodology described above and depicted in FIGS. 2-4 allows accurate continuous performance analysis regardless of flight conditions/engine geometries. It was also noted that the entire continuous performance analysis that is conducted by the processor 144 would be described. Referring now to FIG. 5, the description of that process 500 will now be provided.

As FIG. 5 depicts, after the corrected performance characteristic value of the engine at the current flight (engine) condition (216) is generated, the value is supplied to two separate processes, represented by blocks 506 and 508. In one process 506, the processor 144 calculates, continuously and in real-time, an estimate of one engine performance parameter at a predetermined value of another engine performance parameter using two previously stored performance characteristic curves representative of the steady state relationships between the two engine performance parameters. The two previously stored performance characteristic curves preferably comprise a first curve that is the most recently calculated and stored curve, and a second curve that is calculated and stored at a significantly higher engine operating hour and has noticeably different values than the first curve. As noted above, since it is desired to conduct a continuous power assurance analysis of the engine 100, for each corrected performance characteristic value of power turbine inlet temperature (T45c) and engine torque (Qc), the processor calculates an estimate of power turbine inlet temperature margin and power available. This block 506 is labeled "Extrapolation" because, as will be described in more detail further below, the calculations are extrapolation-type calculations.

The other process 508 that receives the corrected performance characteristic values is a binning process. During the binning process 508, the corrected performance characteristic values are stored in data storage bins. More specifically, and with quick reference back to FIG. 1, a predetermined number of data storage bins 148 (e.g., 148-1, 148-2, 148-3, . . . , 148-N) are provided in memory 144. The number of data storage bins 148 may vary, but each is representative of a predefined value range of the second engine performance parameter. With reference once again to FIG. 5, and as was mentioned above, in the depicted embodiment the first corrected engine performance parameter is power turbine inlet temperature (T45c) and the second engine performance parameter is engine torque (Qc). Thus, each data storage bin 148 is representative of a predefined value range of engine torque (Qc). While the predefined value range, and hence the number of data storage bins, may vary, in one particular embodiment, in which engine torque (Qc) may vary from 1% to 130%, the predefined value range is 1%, thereby resulting in 130 storage bins 148 being provided.

No matter the specific number of data storage bins 148 provided, each is used to store the corrected performance characteristic values. The corrected performance characteristic values are not cumulatively stored in the storage bins 148 over the life of the gas turbine engine 100. Rather, the corrected performance characteristic values are stored during an operational cycle of the engine 100. For example, in the case where the engine 100 is installed in a helicopter, the corrected performance characteristic values are stored in the storage bins 148 during each flight. It is noted that older sets of stored corrected performance characteristic values (also referred to herein as "binned data") may be stored until the mean values exceed those of the last flight by a predetermined amount (e.g., 10° F.) or a maximum number of stored bin sets is reached.

As FIG. 5 depicts, after each flight the corrected performance characteristic values stored during that flight are used to generate a performance characteristic curve representative of the steady state relationship between the first and second engine parameters, referred to herein as an empirical deterioration model 512. In the depicted embodiment, the binned data are used to generate a performance characteristic curve representative of the steady state relationship between power turbine inlet temperature (T45) and engine torque (Qc). As will be described further below, this performance characteristic curve 512 is used during the next flight. The performance characteristic/empirical deterioration models may also be used in various post-flight data trending analyses and/or various prognostic health monitoring (PHM) analyses 514. It should be noted that during a flight, as each new corrected performance characteristic value (e.g., T45) is stored within its appropriate bin 148, the mean and standard deviation of that storage bin 148 are recursively calculated and stored. The mean value of each bin 148 represents a data point in the performance characteristic curve, and the standard deviation indicates the variability of data values in each bin 148. After the mean and standard deviation are updated and stored for a new data point, the raw data is preferably discarded in order to reduce data memory requirements. Moreover, if there are any unfilled bins 148 following a flight, those unfilled bins are preferably filled by extrapolation of the filled bins, consistent with the extrapolation methodology that is described further below.

The above-described binning method of storing corrected performance characteristic values is used for various reasons. First, using storage bins 148 instead of equations for storing characteristic curve data provides more flexibility to store any curve shape. Using a relatively large number of bins 148, each representative of a predetermined range value (e.g., 1%), allows for the use of simple integer round-off methods when assigning each corrected performance characteristic value to a bin 148, and results in the data within each bin having consistent characteristics. Additionally, the phase compensation methodology 502 provides a relatively large amount of substantially continuous data to fill a larger range of storage bins 148.

Returning again to the description of the continuous performance analysis methodology 500, as was mentioned previously, estimates of power turbine inlet temperature margin and power available 506 are calculated during the current flight using phase compensated and flight-condition performance values from the current flight and performance characteristic curves from previous flights. In particular, performance characteristic curves from previously flights are used as a reference for determining relative shifts in power turbine inlet temperature (T45) at maximum rated power (MRP) torque. As is generally known, MRP torque is the torque value at which the power turbine inlet temperature margin is calculated, and is also the maximum torque value specified by the engine manufacturer for safe engine operation. This methodology is referred to herein as the deterioration model extrapolation method. A detailed description of the deterioration model method is provided in the '997 patent and, for brevity, will not be repeated herein.

The estimated T45_MAX calculations for each new corrected performance characteristic value are likely to produce relatively noisy results. As a result, and as FIG. 5 further depicts, the estimated T45_MAX calculations are filtered to provide relatively stable, real-time estimates 516. As FIG. 5 also depicts, the filtered T45_MAX calculations are also uncorrected. That is, the theta (θ-correction) and the delta (δ-correction) corrections are undone. The filtered T45_MAX calculations, which are supplied continuously during engine 100 (or system) operation, are then used to provide continuous T45 Margin and continuous power available estimates 518 to a user, such as a pilot. As may be appreciated, the continuous power available estimate is calculated based on the power turbine speed and the torque value at which the extrapolated characteristic curve 406 intersect the T45 limit 414.

The system and methods described herein may be used to translate engine performance characteristics of a variable-geometry gas turbine engine from various flight conditions to the rating point condition as the flight condition changes throughout a flight. The systems and methods described herein may also be used to translate engine performance characteristics of a fixed-geometry gas turbine engine from various flight conditions to the rating point condition. Moreover, the systems and methods described herein may be used for any one of numerous systems that exhibit variable performance characteristics at different operating conditions, not just gas turbine engine systems.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of operating a gas turbine engine, comprising the steps of:

continuously, and in real-time throughout operation of the gas turbine engine:

sensing, at a current engine condition, a first engine performance parameter and a second engine performance parameter, wherein the first engine performance parameter is power turbine inlet temperature and the second engine performance parameter is engine torque;

retrieving, from a memory, a first reference performance curve associated with the first and second engine performance parameters at the current engine condition;

evaluating, in a processor, the first reference performance curve at the measured performance characteristic value of the engine to retrieve a first reference performance datum therefrom;

retrieving, from the memory, a second reference performance curve associated with the first and second engine performance parameters at a selected reference engine condition;

evaluating, in the processor, the second reference performance curve at the measured performance characteristic value of the engine to retrieve a second reference performance datum therefrom;

calculating, in the processor, a difference between the first reference performance datum and the second reference performance datum, to thereby generate a translation value;

translating, in the processor, the measured performance characteristic value of the engine an amount equal to the translation value, to thereby generate a corrected performance characteristic value of the engine at the selected reference engine condition;

for the corrected performance characteristic value, calculating an estimate of the first engine performance parameter at a predetermined value of the second engine performance parameter using two previously stored performance characteristic curves representative of the steady state relationship between the first and second engine performance parameters, wherein the predetermined value of the second engine performance parameter is maximum rated power torque and the calculated estimate of the first engine performance parameter is a calculated estimate of power turbine inlet temperature at the maximum rated power torque;

calculating power turbine inlet temperature margin from a predetermined power turbine inlet temperature limit value and the calculated estimate of power turbine inlet temperature at the maximum rated power torque;

calculating power available from the engine; and operating the engine based at least in part on the calculated estimate of the first engine performance parameter; and supplying the calculated power turbine inlet temperature margin and the calculated power available to a pilot while the engine is operating.

2. The method of claim 1, further comprising:
applying transfer functions to at least one of the first and second system performance parameters to thereby generate phase compensated performance data representative of a steady state relationship between the first and second engine performance parameters; and
using the phase compensated performance data to determine the measured performance characteristic value of the system.

3. The method of claim 1, further comprising:
providing a predetermined number of data storage bins, each data storage bin representative of a predefined value range of engine torque;
storing the corrected performance characteristic value in an appropriate one of the data storage bins; and
generating a performance characteristic curve from corrected performance characteristic values stored in each of the data storage bins.

4. The method of claim 3, further comprising:
recursively calculating a mean and a standard deviation of the corrected performance characteristic values stored in each of the data storage bins; and
generating the performance characteristic curve using the recursively calculated mean and standard deviation values.

5. A gas turbine engine continuous performance analysis and control system, comprising:
a first sensor operable to sense, at a current flight condition, a first engine performance parameter and supply first engine performance parameter data representative of the first engine performance parameter, wherein the first engine performance parameter is power turbine inlet temperature;
a second sensor operable to sense, at the current flight condition, a second engine performance parameter and supply second engine performance parameter data representative of the second engine performance parameter, wherein the second engine performance parameter is engine torque;
memory having stored therein reference performance data associated with the first and second engine performance parameters at a plurality of flight conditions; and
a processor in operable communication with the first sensor, the second sensor, and the memory, the processor coupled to receive the first and second engine performance parameter data from the first and second sensors, respectively, and configured, upon receipt thereof, to continuously, and in real-time throughout operation of the gas turbine engine:
 calculate, using the first and second engine performance parameters, an estimate of a performance characteristic value of the engine;
 retrieve, from the memory, a first reference performance curve associated with the first and second engine performance parameters at the current flight condition;
 evaluate the first reference performance curve at the performance characteristic value of the engine to retrieve a first reference performance datum therefrom;
 retrieve, from the memory, a second reference performance curve associated with the first and second engine performance parameters at a selected reference flight condition;
 evaluate the second reference performance curve at the performance characteristic value of the engine to retrieve a second reference performance datum therefrom;
 calculate a difference between the first reference performance datum and the second reference performance datum, to thereby generate a translation value;
 translate the measured performance characteristic value of the engine an amount equal to the translation value, to thereby generate a corrected performance characteristic value of the engine at the selected reference flight condition;
 calculate, for the corrected performance characteristic value, an estimate of the first engine performance parameter at a predetermined value of the second engine performance parameter using two previously stored performance characteristic curves representative of the steady state relationship between the first and second engine performance parameters, wherein the predetermined value of the second engine performance parameter is maximum rated power torque and the calculated estimate of the first engine performance parameter is a calculated estimate of power turbine inlet temperature at the maximum rated power torque;
 calculating power turbine inlet temperature margin from a predetermined power turbine inlet temperature limit value and the calculated estimate of power turbine inlet temperature at the maximum rated power torque;
 calculating power available from the engine;
  control operation of the gas turbine engine based at least in part on the calculated estimate of the first engine performance; and
 supplying the calculated power turbine inlet temperature margin and the calculated power available to a pilot while the engine is operating.

6. The system of claim 5, wherein the processor is further configured to:
apply transfer functions to at least one of the first and second system performance parameters to thereby generate phase compensated performance data representative of a steady state relationship between the first and second engine performance parameters; and
use the phase compensated performance data to determine the measured performance characteristic value of the system.

* * * * *